Jan. 4, 1966  R. A. GARMAN  3,227,182
DUAL CHANNEL SHUT-OFF VALVE
Filed Feb. 25, 1963  3 Sheets-Sheet 1
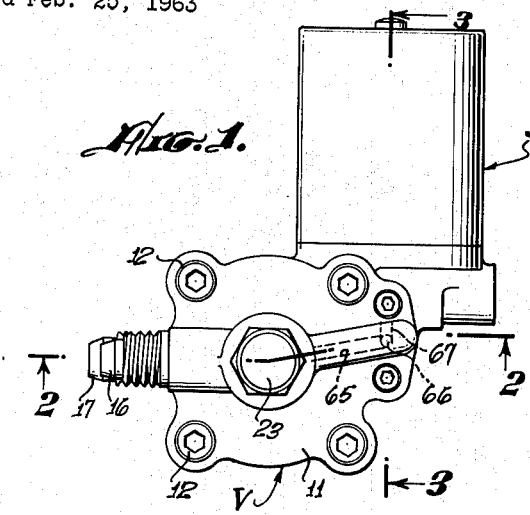
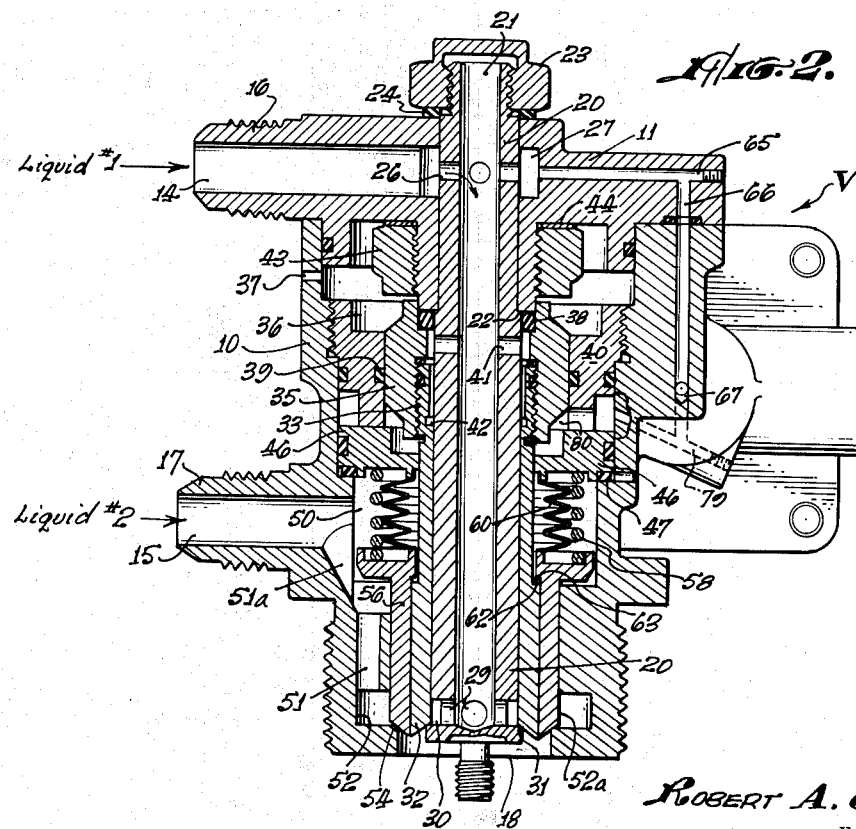
ROBERT A. GARMAN,
INVENTOR.
BY Knight + Rodgers
ATTORNEYS

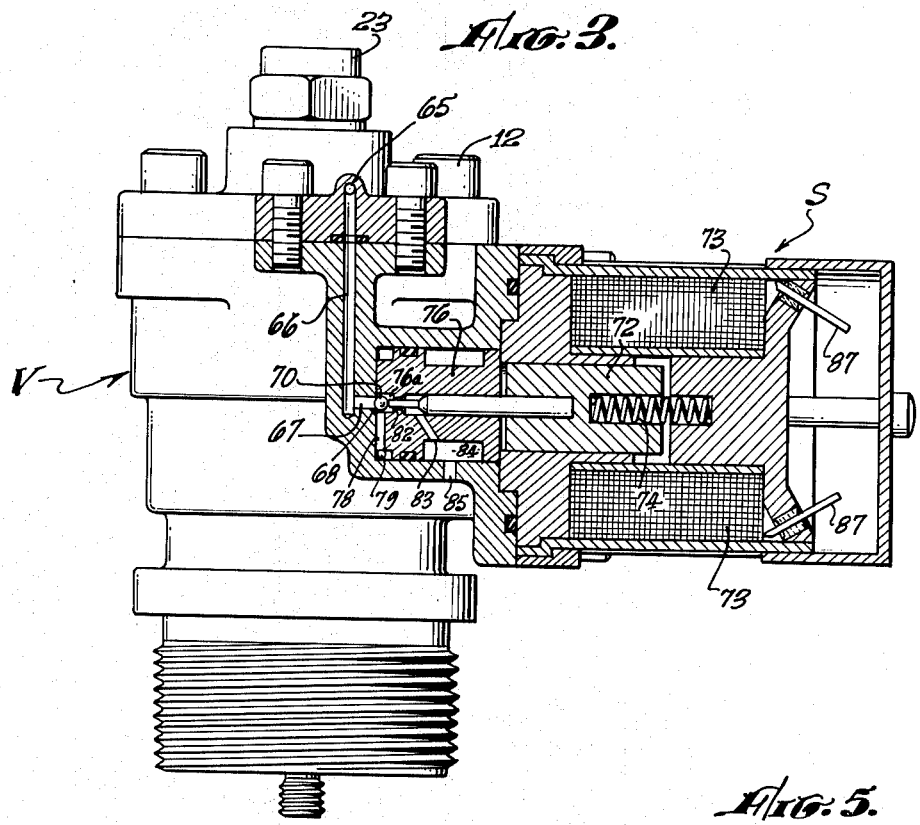
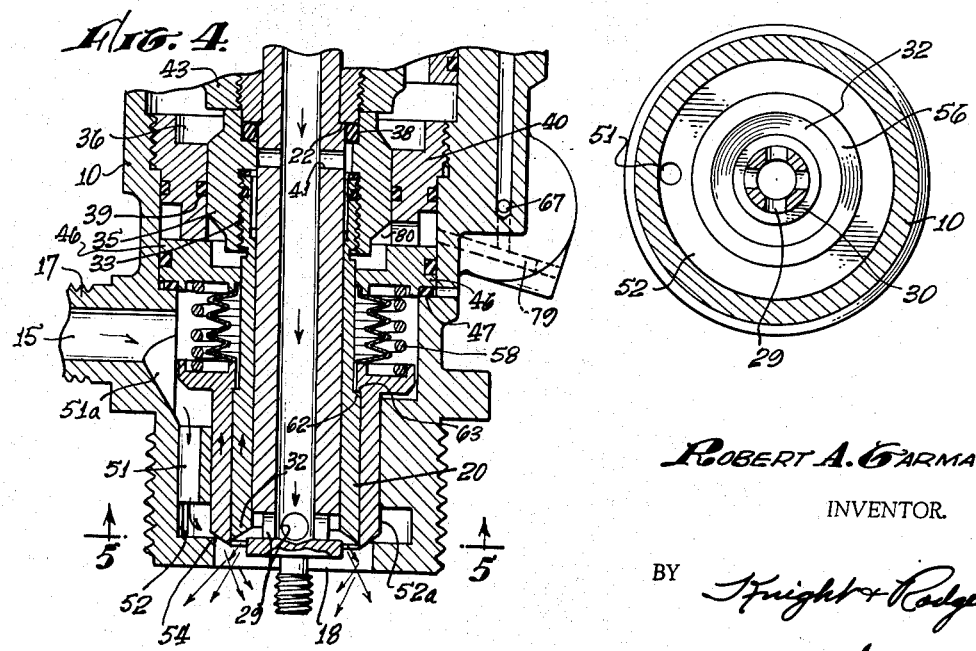
Robert A. Garman,
INVENTOR.

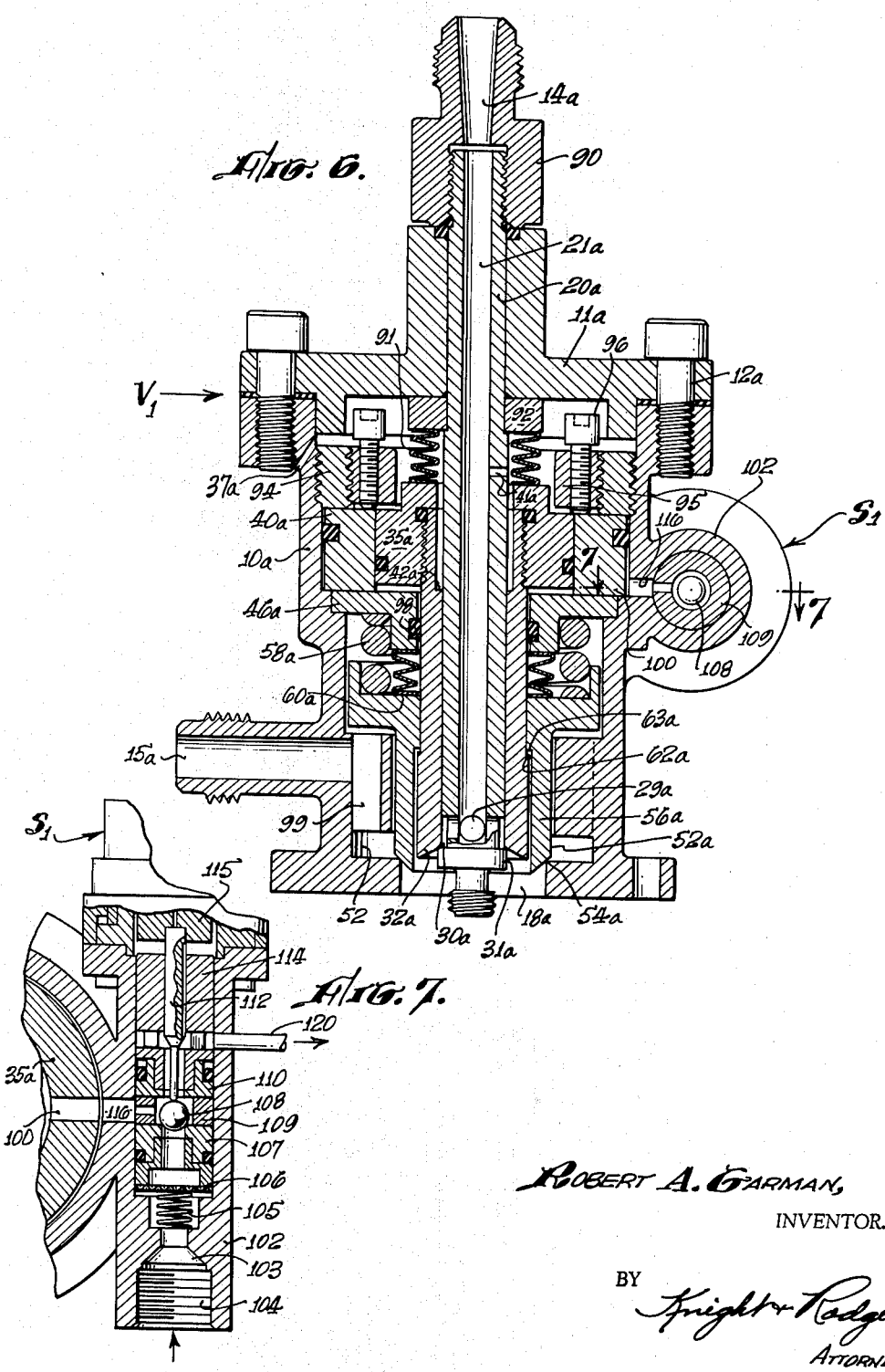

3,227,182
DUAL CHANNEL SHUT-OFF VALVE
Robert A. Garman, Fallbrook, Calif., assignor to Sterer Engineering and Manufacturing Company, Los Angeles, Calif., a corporation of California
Filed Feb. 25, 1963, Ser. No. 260,375
11 Claims. (Cl. 137—630.22)

The present invention relates generally to shut-off valves and more particularly to a valve structure having two adjacent ports from which may be discharged simultaneously two different fluids to be mixed in the immediate vicinity of the valve, as for example a liquid synthetic resin and a catalyst to harden the resin or two fluids to be mixed to form a combustible mixture.

A valve of this character should produce complete and reliable closure of each of the discharge ports in order to immediately stop flow of both fluids when the valve is closed and to insure that there is no leakage of either liquid thereafter. Certain closure of both of the discharge ports is advantageous for obvious reasons. Thus, it is a general object of the invention to provide a valve structure of this character in which each of the discharge ports is closed independently by a valve which is certain to operate and which is not influenced adversely by the failure of the other valve to close.

At the same time, a shut-off valve of this character should provide substantially simultaneous opening of both ports in order to permit in effect unitary control of the discharge of both liquids with a single actuator. Thus, it is an object of the invention to provide separate closure means for each of the ports which are operated substantially simultaneously in order to provide a unitary control of the opening and closing of both the discharge ports.

It is a further object of the invention to provide for positive separation of the two fluids while within the valve housing and to avoid all leakage which would have the effect of causing even a small quantity of one fluid to mingle with the other.

Since the two fluids are to be mixed externally of the valve but closely adjacent thereto, it is a further object to provide a valve structure in which the discharge ports are adjacent each other and are of efficient design for achieving thorough mixing of the two fluids discharged from the two ports.

A further object of the invention is to provide a design of a shut-off valve of this character in which the valve members are normally biased to a closed position thereby creating a fail-safe structure.

A further object of the invention is to provide a shut-off valve of such design that the moving parts thereof are able to compensate for changes of dimensions created by wear, change in temperature, normal manufacturing variations in size, and other conditions which could create operating problems.

These advantages are achieved according to the present invention by providing a valve structure comprising a body having two separate fluid channels terminating at two separate discharge ports adjacent to each other to enable mixing of the fluids discharged from said ports in the vicinity of but externally of the valve body, a valve seat at each discharge port, and a separate valve member cooperating with each valve seat and movable with respect thereto to control discharge of fluid from the associated port, each valve member being movable between open and closed positions. Valve closing means are provided normally urging each valve member individually to a closed position and valve openings means are likewise provided opening both valves against the force of the valve closing means, such opening means including a fluid pressure responsive member connected to one valve member and means to control application to said fluid responsive member of fluid pressure from a suitable source, typically one of the fluid channels within the valve body. Means on the valves engage to move both valves to open position as said one valve member is moved to open position by the pressure responsive member.

How the above and other objects and advantages of the invention are attained will be more readily understood by reference to the following description and to the annexed drawing, in which:

FIG. 1 is a plan view of a valve embodying the present invention.

FIG. 2 is a longitudinal section on line 2—2 of FIG. 1 showing the valve members in closed position.

FIG. 3 is a combined vertical section and side elevation on line 3—3 of FIG. 1.

FIG. 4 is a fragmentary view similar to FIG. 2 showing the valve members in open position.

FIG. 5 is a transverse section on line 5—5 of FIG. 4 at the discharge ports.

FIG. 6 is a longitudinal median section of a variational form of valve.

FIG. 7 is a fragmentary section on line 7—7 of FIG. 6 of the pilot valve structure.

Referring now to the drawing, and more particularly to FIG. 2, it will be seen therefrom that the valve structure V of the present invention comprises a body or housing having two principal parts, a main body section 10 and a removable cover 11 which is secured to body section 10 by means of a plurality of screws 12 or any other suitable means. Upon removal of cover 11, access is had to the movable internal parts of the valve structure within the body. The body has two fluid inlets provided by the bores 14 and 15 located respectively within the externally threaded bosses 16 and 17 on the cover and body and an outlet 18 at the bottom of the body. As will be developed in the course of the following description, the body encloses means providing two separate fluid channels through the body, respectively between said inlets 14 and 15 and common outlet 18. The bores 14 and 15 each provide the initial or inlet sections of one of the fluid channels and the bosses provide means whereby the inlets may be connected to suitable conduit means, not shown, for feeding a suitable fluid to each of the passages from sources not shown in the drawing. Though not limited to liquids, it is contemplated that the fluids handled by the valve will be liquids and so are described as such herein.

Cover 11 of the body has a centrally located bore in which is located hollow shaft 20 that is provided with a longitudinally extending axial bore 21. Shaft 20 has an external shoulder 22 which engages a shoulder on cover 11 when cap nut 23, threaded onto the projecting end of the shaft, is tightened to mount the shaft on cover 11. Nut 23 closes the end of bore 21, and a fluid tight seal between the nut and cover 11 is obtained by means of suitable sealing means, such as an O-ring seal at 24 surrounding the shaft.

Bore 21 through shaft 20 provides the principal portion of one of the two fluid channels, which shall be referred to herein for purposes of identification as the first fluid channel, communication between bore 21 and inlet section 14 also a part of the first fluid channel, being afforded by means of a plurality of radial ports 26 in the shaft. A plurality of such ports are provided at a location to be in communication with an annular chamber 27 surrounding shaft 20 at the inner end of passage 14 in order to provide unrestricted fluid flow into passage 21. The lower end of bore 21 is in communication with one or more ports 29 which are preferably radially extending openings through the wall of shaft 20 and which are located adjoining a projecting annular shoulder 31 below the ports and near the lower end of shaft 20. The outer ends of ports 29 are connected by an annular groove 30 cut in the shaft adjoining shoulder 31, the groove forming an annular discharge port. Shoulder 31 provides an annular valve seat adjoining the discharge port 30, the purpose of which is to control fluid flow through the annular port. Thus, the principal parts of the first fluid channel are in sequence passages 14, 26, 21, 29 and 30.

The movable valve member cooperating with annular valve seat 31 to close discharge port 30 is in the form of sleeve 32 slidably mounted upon the exterior surface of shaft 20 and movable axially relative thereto. Sleeve 32 is annular in cross section and engages the annular valve seat 31 to close port 30 and prevent discharge of liquid therefrom. The annular sleeve is shown in its lower or closed position in FIG. 2.

At its upper end, the end remote from the valve seat, sleeve 32 is threaded externally at 33 to provide means for connecting to the annular valve member an internally threaded piston 35. Piston 35 is exposed at its upper end to fluid pressure in chamber 36. Chamber 36 is vented externally of body 10 by port 37. This may open to atmosphere as shown, or it may communicate with a conduit that is part of a fluid system. In either case chamber 36 is maintained by port 37 at a relatively low pressure, herein termed exhaust pressure, which may be atmospheric or more or less. To prevent leakage of fluid under pressure into chamber 36, various sealing means are supplied. Thus, an O-ring type seal is provided at 38 between the upper end of piston 35 and the exterior surface of shaft 20 and another seal 39 is provided between the exterior peripheral surface of piston 35 and piston guide 40 which is threaded externally for connection with main body 10.

One or more ports 41 are provided in the wall of shaft 20 and terminating externally of shaft 20 at a point below seal 38 and above shoulder 42 on the inner valve sleeve 32. Shoulder 42 is exposed to fluid from the first fluid channel passing from bore 21 through ports 41. This fluid is at the relatively high inlet pressure, and the force exerted thereby on valve member 32 is axial of the valve and in a direction to move the valve into closed position and hold it there as the shoulder 42 is continuously subjected to this inlet fluid pressure. When the valve member is raised to open position, the space above shoulder 42 contracts and excess fluid flows inwardly of ports 41 to allow the valve member to lift freely, as will be more apparent later.

The travel of piston 35 and attached valve member 32 away from seat 31 is relatively small, typical travel being of the order of a few hundredths of an inch, although it will be realized that the invention is in no way limited to a particular range of travel of the valve with relation to seat 31. The upward motion of piston 35 and valve member 32 in a direction to open port 30 is limited by engagement of the piston with the underside of stop nut 43 which is threaded onto a sleeve-like portion of cover 11 surrounding shaft 20. A precise positioning of the lower face of the stop nut which is engaged by piston 35 to limit its upward travel, can be obtained by placing a shim of the desired thickness at the upper end of the nut between the nut and the opposing face on cover 11, such a shim being indicated at 44. The thickness of shim 44 can be selected to obtain the desired width of opening between seat 31 and valve member 32 regardless of any inequalities in the dimensions of the parts in the course of manufacture and/or assembly.

Piston guide 40 is inserted into the cavity within body section 10 when cover 11 is removed. It is provided with external threads which engage complementary threads on the body and the guide is then screwed down to bring its lower end surface into engagement with the upper surface of abutment plate 46. In this way the piston guide serves also as a nut which holds in assembled positions a group of parts within the cavity of body 10, as will become evident. The abutment plate is inserted into the body cavity within body section 10 ahead of piston guide 40 and is located therein by engagement with an upwardly facing shoulder 47 on the body section. Abutment plate 46 is provided with suitable seals to prevent leakage of liquid between it and the engaging surfaces of the body section.

Below the abutment plate is the second of the two fluid channels referred to above as being contained within the valve body, the second channel having as its initial section inlet passage 15 within boss 17. Inlet passage 15 terminates at its inner end at the chamber 50 within body section 10 immediately below abutment plate 46. Chamber 50 communicates through longitudinally extending passage 51 with annular chamber 52. A recess is preferably cut in the wall of the body at 51a to facilitate free flow of fluid into passage 51. Annular chamber 52 is formed by undercutting the body a short distance inwardly of outlet orifice 18 to form a chamber with an open side 52a which communicates an annular discharge port at and immediately above a shoulder on the body, the corner of which shoulder constitutes an annular valve seat 54. Flow of fluid through this second fluid channel and out of chamber 52 at port 52a is controlled by a movable valve member 56 which is annular in cross section and slides within a bore in body section 10. Annular valve 56 surrounds and also slides axially upon the exterior surface of the earlier described annular valve member 32. From this construction it will be seen that there are two concentric discharge ports so disposed as to discharge two separate liquids through a common discharge orifice 18 at the lower end of the valve body, the issue of fluid from each port being controlled individually by one of the two annular valve members 32 and 56.

Helical spring 58 located in chamber 50 is under compression and bears at one end against the underside of abutment plate 46 and at the other end against a radial flange on annular valve member 56. Thus, spring 58 normally exerts an axially directed force on the valve member urging it into contact with annular seat 54 to close the discharge port 52a at chamber 52. The upper end of valve sleeve 56 is exposed to fluid pressure in chamber 50 so that the fluid therein, at inlet pressure, exerts continuously a force on the valve member in a direction to urge the valve member into closed position against seat 54 and hold it there.

It is a feature of the invention that the valve is so designed that there is positive assurance the two liquids cannot come into mutual contact within the valve housing. For this reason, an extensible sealing means is provided in chamber 50 between stationary abutment plate 46 and movable valve member 56, such extensible sealing means taking the form preferably of a metallic bellows 60 connected at its two ends respectively to the abutment plate and to the upper end of valve member 56, as may be seen clearly in FIG. 2. Since the chamber 50 surrounding bellows 60 is part of the second fluid channel, it is filled with one of the liquids. Bellows 60 isolates from this liquid any leakage of the other liquid from the first fluid passage which might occur between the abutment plate and inner annular valve member 32. Such leakage is thus confined to the space inside the bellows and outside the valve member and is allowed to pass out between the two annular valves and be discharged at the lower end of the housing through discharge orifice 57.

Positive separation of the two fluid channels can be effected at other positions within the valve by other types of sealing means, especially where a seal is effected between two stationary members. In this instance the bellows has the advantage of providing an entirely isolated drainage passage which conducts any leakage out of the valve structure through the discharge orifice to a point where it can be discharged from the housing.

The two annular valves are normally biased towards closed position, the inner valve member by virtue of fluid at inlet pressure applied to shoulder 42 and the outer valve member by the force applied both by inlet fluid pressure and by spring 58. The two valves are moved to open position by opposing forces applied by fluid pressure, as will be described, such application being controlled by means of a pilot valve. In order that the two valves may be opened substantially simultaneously, means are provided on one valve member to engage the other valve member during travel from the closed to the open position. Such means include shoulder 62 on the exterior of the inner valve member 32 which is engageable with an opposing and cooperating shoulder 63 on the interior bore of the outer valve member 56. The clearance between these two shoulders is normally relatively small, being of the order of .001 inch, more or less, and this clearance between the two shoulders is exaggerated in FIG. 2 for purposes of illustration.

In order to move both valves to an open position, fluid pressure from one of the fluid passages, typically and preferably the first fluid channel, is applied to the underside of piston 35 to apply a force thereto in an upward direction to move the valves 32 and 56 from the closed position to the open position. Application of fluid pressure to the piston is effected through a system of small passages through which the transmission of fluid pressure is controlled by a pilot valve. This pressure transmitting system includes passage 65 which communicates at one end with annular chamber 27 in the inner end of inlet 14 and forming a portion of the first fluid passage. Near the other end passage 65 is intersected by passage 66 which is contained partially in cover 11 and partially in body section 10, the two segments of the passage being aligned when the cover is assembled in position so that the passage is continuous. Passage 66 communicates with a short passage 67 as shown in FIG. 3, one end of which provides an annular valve seat 68 which is engaged by ball valve 70 to close the pressure passage at this point.

Ball valve 70 is held in recess 76a in the end of plug 76 and is normally urged to the closed position in engagement with seat 68 by plunger 71. Plunger 71 is mounted on reciprocable armature 72 of the solenoid indicated generally at S, such solenoid having windings 73 surrounding the armature. The armature is normally urged toward a forward position in which ball valve 70 closes the pressure passage, this being to the left of FIG. 3. For this purpose compression spring 74 bears at one end against armature 72 and at the other end against a stationary portion of the solenoid. The forward end of plunger 71 is guided by a bore in plug 76 which is stationary but removably mounted in the body section 10.

The portion of the pressure passage so far described is always in free communication with the inlet pressure existing in the incoming line at inlet passage 14. Downstream from valve 70, the pressure transmitting passage is under a lower pressure when valve 70 is closed. This downstream section includes passage 78 which for convenience is located in the forward face of plug 76, and section 79 which communicates with passage 78 and also with space 80 between piston 35 and abutment plate 46. Piston 35 is exposed at its underside to fluid pressure existing in the space 80 and is responsive to such pressure.

Within recess 76a is an annular shoulder 82 forming a second seat engageable by ball valve 70 when it is positioned inwardly of the seat. This is possible when plunger 71 is retracted, as will be further explained, the plunger moving to the right in FIG. 3 sufficiently far that ball valve 70 can engage seat 82. On the side of shoulder 82 away from ball valve 70 is passage 83 which communicates at one end with the bore containing plunger 71 and at the other end with an annular recess 84 in plug 76. Vent port 85 in the wall housing 10 also communicates with the annular space 84, thus venting to atmospheric pressure the annulus 84 and the space behind shoulder 82.

Additional details of construction of solenoid S are omitted since the solenoid may be of any suitable type and the construction of such units is well known. The solenoid is energized through a pair of conductors 87 which are connected through a suitable switch, not shown, to a suitable source of power, also not shown.

Having described the construction of my improved shut-off valve, its operation will now be described. When solenoid S is de-energized, both valve sleeves 32 and 56 are held in the normally closed position of FIG. 2 in which both the annular discharge ports 30 and 52a adjoining discharge orifice 18, are closed. The net forces continuously acting on each of these movable valve sleeves are unbalanced in a direction to urge the valve sleeves to the closed position.

With respect to the inner valve member 32, this member is held in a downward position by fluid pressure on an interior shoulder 42 at inlet pressure produced by fluid which reaches the shoulder through ports 41. The piston 35 attached to this valve member is subjected on both upper and lower faces to fluid at atmospheric or exhaust pressure so that these two forces are balanced, the end areas on the piston being equal. In the case of the outer annular valve member 56, the downward forces exerted on it consist of the net resultant of the force of the fluid pressure existing in chamber 50 plus the downward pressures exerted by compression spring 58 and bellows 60.

To open the discharge ports, solenoid S is energized by suitable current applied through conductors 87, retracting armature 72 against the force exerted thereon by compression spring 74. This movement of the armature pulls plunger 71 to the right as viewed in FIG. 3, allowing ball valve 70 to be moved away from seat 68 by fluid pressure thereon from the fluid in passage 67. The force exerted by this operating fluid at inlet pressure moves ball valve against a second seat at shoulder 82, thus closing recess 76a at the inner end thereof and shutting off communication of the recess with passages 83, 84 and 15. Operating fluid under inlet pressure can now pass valve 70 and travel through passages 78 and 79 to build up pressure in internal chamber 80 and expose the underface of piston 35 to inlet pressure from the first fluid channel. The inlet pressure, being substantially greater than the exhaust pressure on the upper face of the piston, forces the piston to rise suddenly.

During the initial portion of the upward stroke of piston 35, the piston carries with it only the inner valve member 32 since the piston and the valve are rigidly connected together. After moving for a short distance, the gap at shoulder 62 is closed and shoulder 62 engages the cooperating shoulder 63 on the outer valve member 56, carrying the outer valve sleeve upwardly along with the inner valve sleeve. The two valve sleeves are thus carried upwardly together for the remainder of their travel by the fluid pressure exerted on piston 35, opening both ports 30 and 52a. In the illustrative design, fluid pressure at 14 is assumed to be greater than at 15, but if necessary the effective area of the underside of piston 35 can be increased to increase the available opening force on the piston. The length of the upstroke of the piston and of the inner valve member is regulated by the distance piston 35 travels before engaging stop nut 43. Both discharge ports are thereby opened and the fluids are able to flow through the housing to be discharged from the ports and to be intermingled with each other adjacent the discharge ports.

To shut off the discharge of fluid, windings 73 of solenoid S are de-energized, thus allowing spring 74 to return armature 72 to the position shown in FIG. 3. The armature advances plunger 71 (to the left in the drawing) and carries ball valve 70 from seat 82 into engagement with seat 68 at the end of passage 67 where the ball is held against inlet fluid pressure.

As ball valve 70 is transferred from seat 82 to seat 68, passage 78 is placed in communication through the central opening in seat 82 with passages 83, 84 and 85 to thereby vent the pressure in space 80 underneath piston 35 to the atmosphere. Bleeding off the pressure through these passages restores the initial unbalance of forces acting on piston 35 so that piston 35 is moved downwardly carrying with it the inner annular valve member 32. At the same time the outer annular valve member 56 is moved downwardly under the influence of compression spring 58. While the two annular valve members move downwardly simultaneously, they are actually moving under independently applied forces and each valve sleeve is carried ultimately to a closed position independently of the other valve sleeve. The downward travel of piston 35 reduces slightly the volume of space 80 underneath the piston and the fluid displaced thereby is discharged through port 85 and wasted to the atmosphere. For purposes of simplicity in disclosure, discharge port is shown as being open to the atmosphere, but it will be realized that it is within the scope of the invention to connect port 85 to any suitable container if it is desired to collect the fluid discharged through the port when piston 35 moves downwardly. These movements complete the cycle of operations, restoring the valve to the closed position shown in the drawing.

A variational form of the invention is illustrated in FIGS. 6 and 7, the difference between that form and the one previously described lying chiefly in the source of the operating fluid utilized to open the valves. In the form of the invention described above one of the fluids, the flow of which is controlled by the valve, is used also as an internal source of operating fluid so that the operating fluid is one of the liquids supplied at inlet pressure. To this extent, the valve is a self-contained unit. On the other hand, in the embodiment of FIGS. 6 and 7, the valve is designed to receive operating fluid from a separate or external source, for example a tank of dry gas. To accommodate a third fluid within the valve body, the structure has been modified to effect a complete separation of it from both of the fluid channels, flow through which is being controlled by the third or operating fluid.

The valve structure of FIG. 6 comprises a body or housing having a main body 10a and a removable cover 11a which is held in place by a plurality of screws 12a. Removal of cover 11a affords access to the cavity within body section 10a within which are located the movable internal parts of the valve structure. Two fluid inlets are provided by bores at 14a and 15a through which fluids, the flow of which is to be controlled, are introduced into the valve structure. These fluids leave the valve body through a common discharge outlet 18a.

Cover 11a of the body has a boss provided with a centrally located bore and in which is located hollow shaft 20a. The axially extending bore 21a extends from end-to-end of shaft 20a, communicating at the upper end with inlet 14a and at the lower end with annular discharge port 30a through one or more ports 29a which extend through the wall of the shaft. The upper end of shaft 20a extends above cover 11a and is threaded or otherwise adapted for attachment thereto of fitting 90 by which any suitable conduit, not shown, is attached to the valve structure.

Surrounding and movable axially relative to shaft 20a is annular valve member 32a which is engageable with annular valve seat 31a outside of and adjacent port 30a in order to regulate flow of fluid through these ports.

The upper end of valve sleeve 32a is threaded to provide a convenient means for securing thereto piston 35a. The upper end of piston 35a is connected to one end of bellows 91, the other end of the bellows being secured to collar 92. The connections of both ends of bellows 92 are made by brazing or other suitable means which insures a fluid tight connection. In a similar manner, collar 92 is welded or attached in any suitable fluid tight manner to shaft 20a.

The space inside bellows 91 and outside shaft 20a is in communication with axial passage 21a through one or more radial ports 41a. Incoming fluid can pass through ports 41a to exert a downward pressure on annular shoulder 42a on the surrounding valve sleeve which forces valve 32a downwardly against seat 31a. At the same time, this fluid is entirely separated from other fluids within the valve structure by suitable fluid tight seals. Any leakage between valve 32a and center post 20a is of no consequence since this leakage is into the vicinity of radial ports 30a and upstream from valve seat 31a and therefore cannot reach the exterior of the valve as long as valve 32a is in contact with its seat.

Surrounding and guiding piston 35a is guide 40a which is held in place by annular nut 94. The nut is threaded externally to engage complementary threads on the inside wall of body 10a and is internally threaded to receive adjustable stop ring 95 which engages piston 35a to limit the upward travel of the piston. Stop ring 95 is adjustable axially of shaft 20a and in the direction of piston travel by turning it relative to annular nut 94. The stop ring can be locked in any suitable position by means of a plurality of cap screws 96 which are threaded into the body of the stop ring and pass through it to engage the upper surface of piston guide 40a. When the cap screws are tightened, they hold the stop ring against rotation relative to the nut and lock it in any adjusted position.

Beneath piston guide 40a and held in place by engagement with the guide, is annular abutment plate 46a. The abutment plate has a central opening through which passes sleeve 32a as it moves longitudinally of the center post 20a, as will be further described. In the central opening is located seal 98, typically an O-ring type seal, which effects a fluid tight seal between the external surface of sleeve 32a and abutment plate 46a.

Underneath the abutment plate 46a is bellows 60a. The bellows 60a is connected at its upper end to the abutment plate and at its lower end to outer sleeve 56a, both connections being fluid tight in order to permit movement of sleeve 56a within the valve housing and relative to the stationary portions of the valve and yet maintain a fluid tight separation between the spaces on the inside and the outside of bellows 60a. Coil spring 58a bears at its upper end against abutment plate 46a and at its lower end against the flanged end of sleeve 56a to urge the sleeve downwardly into contact with valve seat 54a. The flange on sleeve valve 56a has sufficient clearance with the body to allow fluid from inlet 15a to exert pressure on the upper face of the flange to close valve member 56a.

As in the form of valve previously described, an annular chamber 52 is formed inwardly of discharge orifice 18a, having an open side 52a. This open side constitutes an annular discharge port at and immediately above the shoulder 54a, such discharge port being closed by contact of sleeve 56a with the annular valve seat 54a. The second fluid channel through the valve body is provided by inlet 15a, chamber 52 and passage 99 which interconnects inlet 15a with the annular chamber. Flow through this second channel and out of it by way of discharge port 18a is controlled by the outer valve sleeve 56a.

The two valve sleeves 32a and 56a are moved to open position by fluid pressure on the underside of piston 35a, operating fluid for this purpose being admitted to this face of the piston through a short radial passage 100 in piston guide 40a. Admission of fluid under pressure to the working face of the piston is controlled by the pilot valve structure shown particularly in FIG. 7 and enclosed in a cylindrical boss 102 which is integral with or otherwise suitably mounted upon the side of the main valve housing 10. Boss 102 containing the pilot valve assembly is provided with a longitudinally extending bore 103 which extends for the entire length of the boss. It is threaded at one end at 104 for attachment thereto of a conduit connecting a pilot valve with a source of operating fluid under pressure, for example a tank of dry gas.

Inwardly from the threaded section the bore has a reduced diameter section which provides an internal shoulder against which spring 105 bears, the other end of the spring bearing against the face of filter screen 106. Progressing from the filter screen there is in sequence a two-part valve seat 107 having a central longitudinal bore, one end of which constitutes a valve seat which ball 108 engages; spacer 109 which surrounds ball valve 108; and a second two-piece valve seat 110 which likewise has a central longitudinal bore and provides a second seat at one end of the central bore against which ball 108 can rest, as will be further explained.

Ball valve 108 is normally urged into engagement with seat 107 in the position shown in FIG. 7 by plunger 112 which is slidably mounted in fixed guide 114 and is attached at one end to the reciprocable armature 115 of the solenoid indicated generally at S1, and similar in construction and operation to solenoid S in FIG. 3. When the solenoid is not energized, the armature occupies the forward position shown urging plunger 112 against ball valve 108, thus closing the passage through valve seat 107 against the inlet pressure within the pilot valve. When solenoid S1 is energized, armature 115 is retracted and it moves plunger 112 with it to a retracted position in which ball valve 108 can be carried by the pressure of incoming fluid against the seat 110, thus closing the central passage through the valve seat to fluid flow. In this latter position, fluid can pass around ball valve 108 and through radial openings in spacer 110 to enter passage 116 in the valve body. Passage 116 and passage 100 are placed in registration with each other so that the operating fluid can flow from one to the other and thence to the under face of valve 35a, applying to the piston an upward pressure which carries the piston upwardly into engagement with the stop ring 95, in a manner which will be understood from the description above.

Upon de-energization of solenoid S1, armature 115 and plunger 112 carried thereby are advanced to the position shown in FIG. 7. Plunger 112 now seats the ball valve 108 against seat 107, closing passage 103 to fluid of the incoming operating fluid and against inlet pressure. Ball 108 is now spaced from seat 110, allowing operating fluid underneath piston 35a to flow in a reverse direction through passages 100, 116 past the ball valve and the reduced diameter portion of plunger 112 to escape from the valve housing through vent 120. Vent 120 may be open to the atmosphere or it may be connected to a container, as may be desired. The escape of operating fluid through these passages allows piston 35a to be driven downwardly by pressure of fluid from the first channel exerted on shoulder 42a of the inner sleeve valve. As the inner valve travels downwardly, spring 58a drives the outer sleeve valve 56a downwardly, both valves thus being moved into engagement with their respective seats 31a and 54a to shut off fluid flow through both of the fluid channels within the valve housing.

From the foregoing description it will be seen that a shut-off valve constructed according to the present invention provides for two entirely separated channels for fluid flow through the valve, there being positive isolation of the fluid from each other while still allowing for relative movement of the parts necessary to open and close the sleeve valves.

Also, both forms of the invention provide for simultaneous opening and closing of the two shut-off valves, while at the same time establishing a positive sequence of operation. Also, the two shut-off sleeve valves are capable of independent movement so that each one seats and closes independently of the other since in the closed position there is no positive connection between them.

Operating fluid for applying pressure to the operating piston may be drawn from a source either inside or outside of the shut-off valve, the first form of the invention being designed for tapping an inside source and the second form for using an outside source. In both cases the application of flow of operating fluid is controlled by a pilot valve which likewise provides for discharge of the used operating fluid in order to allow the operating piston to move to its normal closed position.

From the foregoing description it will be understood that various changes in the detailed design and arrangement of the parts constituting my improved shut-off valve may be made without departing from the spirit and scope of the present invention. Accordingly, it should be understood that the foregoing description is considered as being illustrative of, rather than limitative upon, the invention as defined in the appended claims.

I claim:

1. A dual channel shut-off valve structure comprising:
a body;
means within the body defining two separate fluid channels each terminating in a discharge port, the two discharge ports being of annular configuration and arranged concentrically of each other;
an annular valve seat at each discharge port, the two valve seats being arranged concentrically of each other;
hollow sleeve means movable axially thereof relative to the annular seats to control discharge of fluid from said channels, the sleeve means being movable between closed and open positions;
biasing means urging the sleeve means to closed position in engagement with said annular seats;
opening means moving the sleeve means against the biasing means toward open position;
the opening means including a fluid pressure responsive member within the body rigidly connected to one of said valve members and means to apply to said pressure responsive member operating fluid under pressure from one of said channels;
and means for sequentially disengaging the sleeve means from both annular seats upon a fixed predetermined travel of the sleeve means whereby both ports are opened to fluid discharge from said channels in fixed sequence and closed in reverse sequence.

2. A dual channel shut-off valve structure comprising:
a body;
means within the body defining two separate fluid channels each terminating in a discharge port, the two discharge ports being concentric with each other;
a pair of stationary annular valve seats, one at each discharge port, the two seats being concentric with each other;
a pair of concentric hollow tubular valve members movable axially within the body and cooperating respectively with one valve seat to control discharge of fluid from the associated port, each valve member being movable between open and closed positions;
valve closing means normally urging each valve member individually to a closed position;
valve opening means opening both valve members against the forces of the valve closing means, including a fluid pressure responsive member within the body rigidly connected to one of said valve members;
and means to apply to said pressure responsive member operating fluid under pressure from one of said channels.

3. A dual channel shut-off valve structure as in claim 2 in which means are provided for said one valve member to engage the other valve member after disengaging its sea and during travel from the closed to open position to carry the other valve member to its open position.

4. A dual channel shut-off valve structure as in claim 2 in which the valve closing means includes an area on one of the valve members smaller than the effective area on said pressure responsive member and continuously exposed to the inlet pressure in one of the fluid channels, the inlet fluid pressure on said one valve member exerting a force thereon in a direction urging the valve member to closed position.

5. A dual channel shut-off valve structure as claimed in claim 2 which includes an extensible bellows secured at one end to a stationary element of the structure and secured at the other end to one of the movable valve members, said bellows constituting a portion of the means defining one of the fluid channels.

6. A dual channel shut-off valve structure comprising:
   a body;
   means within the body defining two separate fluid channels each terminating in a discharge port, the two discharge ports being of annular configuration and arranged concentrically of each other;
   an annular valve seat at each discharge port, the two valve seats being arranged concentrically of each other;
   a pair of concentric sleeves axially movable and cooperating respectively with one of said valve seats to control discharge of fluid from the associated discharge port, each sleeve being movable between open and closed positions;
   means normally urging each sleeve individually to a closed position in engagement with a valve seat;
   opening means moving both sleeves against the force of the closing means and including a fluid pressure responsive piston secured to one sleeve and means causing said one sleeve to engage the other sleeve during travel away from the valve seat to carry both sleeves away from the seats;
   and means to apply to said pressure responsive piston fluid pressure.

7. A dual channel shut-off valve structure as in claim 6 in which said one sleeve to which the piston is secured has an area continuously exposed to the fluid pressure from one of the fluid channels, the fluid pressure on said one sleeve exerting a force thereon in a direction urging the sleeve toward the associated valve seat and to closed position.

8. A dual channel shut-off valve structure as claimed in claim 7 that also includes spring means normally urging the other of said sleeves toward the associated valve seat to closed position.

9. A dual channel shut-off valve structure as claimed in claim 8 which includes an extensible bellows secured at one end to a stationary element of the structure and secured at the other end to one of said sleeves, said bellows being a portion of the means defining one of the fluid channels.

10. A dual channel valve structure comprising:
    a body;
    a hollow post mounted in the body and having at one end a first annular discharge orifice;
    an annular valve seat on the post adjoining said discharge orifice;
    a second annular discharge orifice formed in the body and spaced radially outwardly from the first discharge orifice;
    a second annular valve seat on the body adjoining the second discharge orifice;
    a pair of concentric sleeves axially movable relative to each other mounted on the post and engageable respectively at one end with one of the valve seats to close the associated discharge port to fluid flow;
    means associated with each sleeve urging the sleeves individually toward the valve seats;
    means for moving both sleeves simultaneously and substantially equally away from the valve seats to open both discharge ports;
    and means within the body conducting fluid to each of said discharge ports.

11. A dual channel valve structure as claimed in claim 10 in which each of the sleeves has an area facing axially away from the valve seats and exposed to fluid pressures exerting a force on the areas in a direction to urge the sleeves toward said seats.

References Cited by the Examiner

UNITED STATES PATENTS

| | | | |
|---|---|---|---|
| 691,975 | 1/1902 | Schaaf | 137—595 XR |
| 2,482,780 | 9/1949 | Kirby | 137—630.22 |
| 2,628,759 | 2/1953 | Bodendoerfer | 222—487 XR |
| 3,070,126 | 12/1962 | Schneider | 137—615 XR |

FOREIGN PATENTS

| | | |
|---|---|---|
| 1,006,824 | 4/1957 | Germany. |

ISADOR WEIL, *Primary Examiner.*

WILLIAM F. O'DEA, *Examiner.*